M. KUEFLER.
QUACK GRASS DIGGER.
APPLICATION FILED MAR. 9, 1914.

1,102,518.

Patented July 7, 1914.
2 SHEETS—SHEET 1.

M. KUEFLER.
QUACK GRASS DIGGER.
APPLICATION FILED MAR. 9, 1914.

1,102,518.

Patented July 7, 1914.

2 SHEETS—SHEET 2.

Witnesses
Inventor
Mathias Kuefler
By his Attorneys

UNITED STATES PATENT OFFICE.

MATHIAS KUEFLER, OF LAKE GEORGE TOWNSHIP, STEARNS COUNTY, MINNESOTA.

QUACK-GRASS DIGGER.

1,102,518.   Specification of Letters Patent.   Patented July 7, 1914.

Application filed March 9, 1914. Serial No. 823,477.

*To all whom it may concern:*

Be it known that I, MATHIAS KUEFLER, a citizen of the United States, residing in Lake George township, in the county of Stearns and State of Minnesota, have invented certain new and useful Improvements in Quack-Grass Diggers; and I do hereby declare the following to be a full, clear, and exact description of the invention, such as will enable others skilled in the art to which it appertains to make and use the same.

My invention has for its object to provide an improved machine for digging quack grass; and, to this end, it consists of the novel devices and combinations of devices hereinafter described and defined in the claims.

As is well known, quack grass grows profusely in cultivated farm lands, and, in many instances, is so destructive to crops, and makes the cultivation of the soil so difficult, that large tracts of farm lands are practically worthless. The extermination of quack grass from the soil in which it has obtained a footing has been an extremely difficult matter.

My machine will dig up this quack grass, and deposit the same on top of the ground, where it is either left to be killed by the sun or raked up and destroyed.

In the accompanying drawings, which illustrate the invention, like characters indicate like parts throughout the several views.

Figure 1:
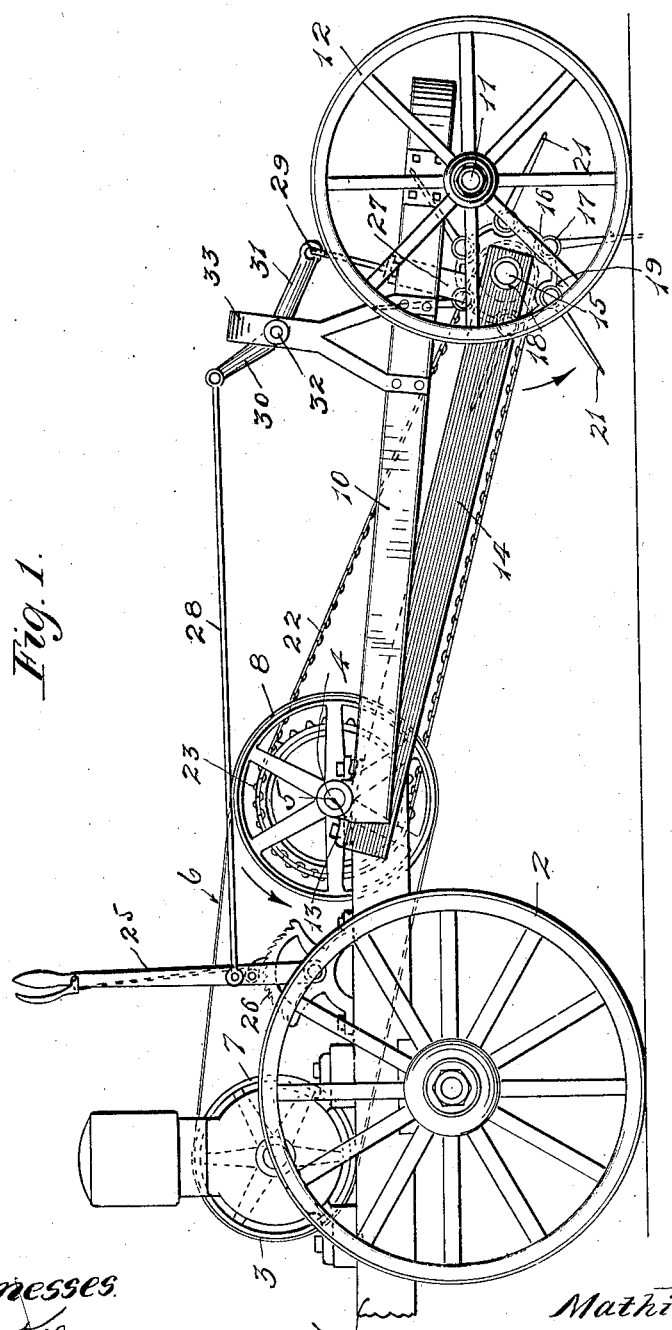
Figure 2:
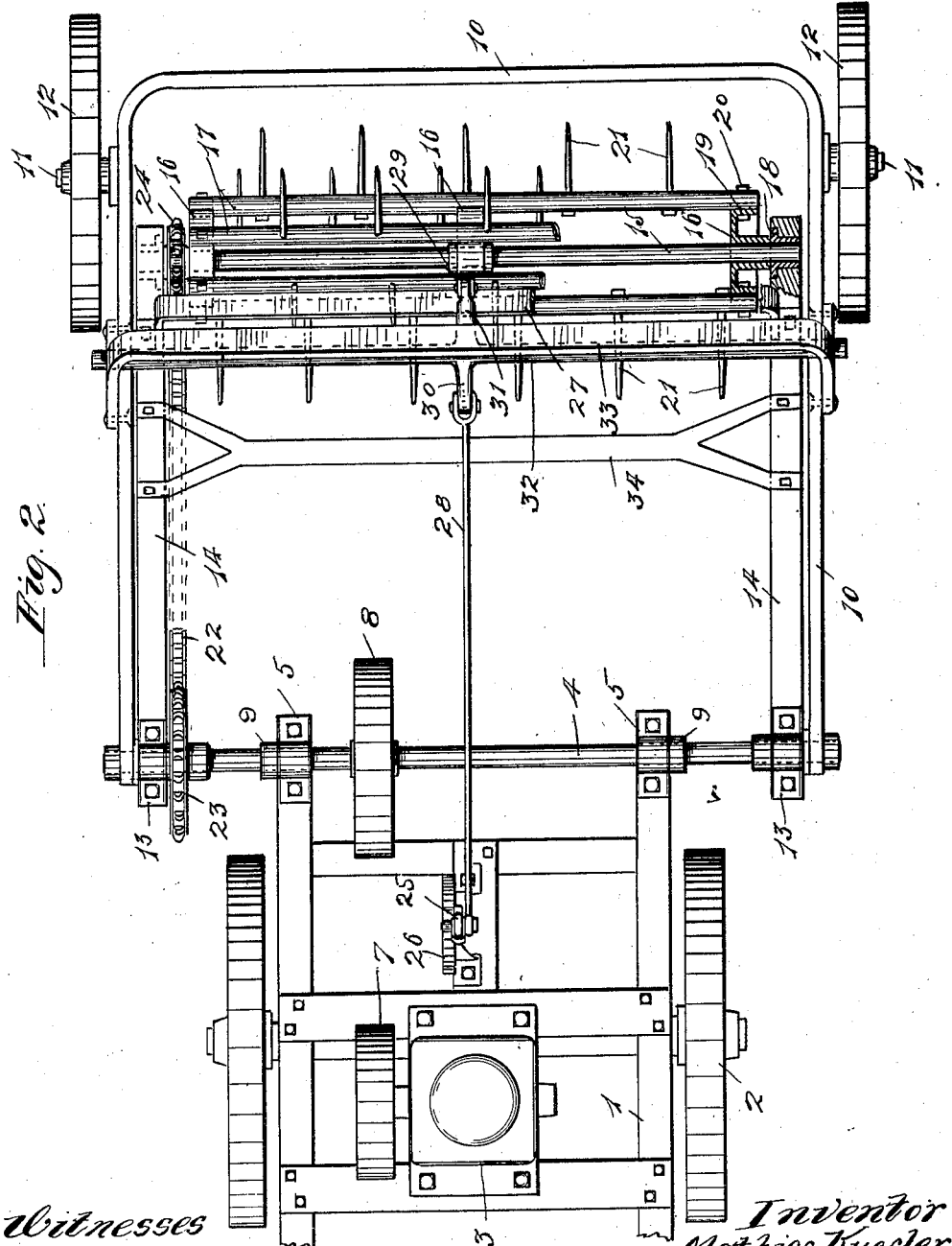

Referring to the drawings, Figure 1 is a side elevation of the improved machine, some parts being broken away; and Fig. 2 is a plan view of the same.

The numeral 1 indicates the rear end portion of a truck frame mounted on a pair of wheels 2, which may be drawn by draft animals or propelled by any suitable means. An explosive engine, indicated as an entirety by the numeral 3, is bolted or otherwise rigidly secured upon the truck frame 1, slightly forward of the wheels 2.

A transversely extended shaft 4 is journaled in horizontally alined bearing 5, secured to the truck frame to the rear of the wheels 2. This shaft 4 is driven in the direction of the arrow marked on Fig. 1, by means of a belt 6 which runs over a relatively small pulley 7, secured to the engine shaft, and a relatively large pulley 8, secured to the shaft 4. Collars 9 on the shaft 4 engage the outer ends of the bearings 5, and thereby hold said shaft against endwise movement with respect to the truck frame 1.

Back of the truck frame 1 is located an approximately horizontally extended supplemental frame 10, pivotally secured, at the forward ends of its side members, to the shaft 4 for vertical swinging movement. On the rear end portions of the side members of the supplemental frame 10 is a pair of axially alined outwardly projecting trunnions 11, on which is journaled a pair of ground-engaging wheels 12 for supporting the rear portion of said frame 10. A pair of rearwardly and downwardly projecting drag bars 14 is pivotally secured, at 13, the shaft 4 for vertical swinging movement just inside of the side bars of the supplemental frame 10.

Journaled on the rear ends of the drag bars 14 is a cylinder provided with ground-engaging teeth. This cylinder comprises a shaft 15, heads 16, and tubular bars 17. The shaft 15 extends parallel with the shaft 4, and is journaled in bearings 18 set into and secured to the rear ends of the drag bars 14. The heads 16, as shown, three in number, are secured to the shaft 5 and provided in their peripheries with segmental circumferentially spaced seats 19, in which the tubular bars 17 are mounted and permanently secured by bolts 20. To each bar 17 is secured a plurality of ground-engaging teeth 21. By reference to Fig. 1, it will be noted that these teeth 21 are backwardly inclined, with respect to the direction of the rotation of the cylinder to which they are secured, the purpose of which will presently appear. It will also be noted, by reference to Fig. 2, that the teeth of one of the bars 17 are staggered, with respect to the teeth on the adjacent bars. The toothed cylinder is rotated in the direction of the arrow marked on Fig. 1, and at a peripheral speed considerably greater than the travel of the truck. This is accomplished by means of a sprocket chain 22 which runs over a relatively large sprocket wheel 23, secured to the shaft 4, and a relatively small sprocket wheel 24, secured to the shaft 15.

A latch lever 25 and coöperating segment 26 on the truck frame 1 are provided for holding the tooth-equipped cylinder in different vertical adjustments. The latch lever 25 is connected to a bail-like bar 27, secured at its ends to the rear ends of the drag bars 14, by a relatively long link 28, pivotally secured to the intermediate portion of said lever, and a relatively short link 29, secured to the intermediate portion of the bar 27. The inner ends of these links 28—29 are pivotally secured, respectively, to a pair of oppositely projecting arms 30—31 on a horizontally extended rock shaft 32. This rock shaft 32 extends transversely above the supplemental frame 10, and is journaled at its ends in the side members of a bail-like bar 33, secured at its ends to the side members of said frame.

Obviously, by setting the latch lever 25 in different adjustments, with respect to the latch segment 26, the free or rear ends of the drag bars 14 may be supported in different elevations, thereby regulating the depth to which the teeth 21 will enter the ground, during the operation of the machine. Or the drag bars may be elevated sufficiently to carry the teeth 21 completely out of the ground, to render the machine inoperative, while the same is being turned around or moved from place to place.

As the peripheral speed of the toothed cylinder is considerably greater than the travel of the wheeled truck, the teeth 21, during the rotation of the cylinder, engage the quack grass below the surface of the ground, and lift the same bodily, together with its roots, out of the ground, and deposit the same at the rear of the machine. By inclining the teeth 21 backward, with respect to the direction of travel of the machine, the said teeth will more readily release the quack grass as the same is lifted from the ground.

The drag bars 14 are connected, just forward of the tooth-equipped cylinder, by a horizontally extended tie bar 34.

The above described device, in actual practice, has been found highly efficient for the purpose had in view.

What I claim is:—

1. In a machine of the kind described, the combination with a truck, of a supplemental frame at the rear of said truck, pivotally secured thereto, at its forward end, for vertical swinging movement, ground-engaging wheels journaled on the rear end of said supplemental frame, a pair of rearwardly projecting drag bars pivotally secured, at their forward ends, to said truck for vertical swinging movements, a cylinder, having ground-engaging teeth, journaled in the rear ends of said drag bars, means for driving said cylinder, and means connected to said supplemental frame for vertically adjusting the rear ends of said drag bars.

2. In a machine of the kind described, the combination with a truck, of a transverse shaft journaled on said truck, means for driving said shaft, a supplemental frame at the rear of said truck, pivotally secured, at its forward end, to said shaft for vertical swinging movement, ground-engaging wheels journaled on the rear end of said supplemental frame, a pair of rearwardly projecting drag bars pivotally secured, at their forward ends, to said shaft for vertical swinging movement, a cylinder, having ground-engaging teeth, journaled in the rear ends of said drag bars, driving connections from said shaft to said cylinder, and means connected to said supplemental frame for vertically adjusting the rear ends of said drag bars.

3. In a machine of the kind described, the combination with a truck having mounted thereon an explosive engine, of a transverse shaft journaled on said truck, driving connections from said engine to said shaft, a supplemental frame at the rear of said truck, pivotally secured, at its forward end, to said shaft for vertical swinging movement, ground-engaging wheels journaled on the rear end of said supplemental frame, a pair of rearwardly projecting drag bars pivotally secured, at their forward ends, to said shaft for vertical swinging movement within said supplemental frame, a cylinder, having ground-engaging teeth, journaled in the rear ends of said drag bars, driving connections from said shaft to said cylinder, and means, including a rock shaft journaled on said supplemental frame, for vertically adjusting the rear ends of said drag bars.

4. In a machine of the kind described, the combination with a truck having mounted thereon an explosive engine, of a transverse shaft journaled on said truck, driving connections from said engine to said shaft, a supplemental frame at the rear of said truck, pivotally secured, at its forward end, to said shaft for vertical swinging movement, ground-engaging wheels journaled on the rear end of said supplemental frame, a pair of rearwardly projecting drag bars pivotally secured, at their forward ends, to said shaft for vertical swinging movement within said supplemental frame, a cylinder, having ground-engaging teeth, journaled to the rear ends of said drag bars, driving connections from said shaft to said cylinder, means for vertically adjusting the rear ends of said drag bars, comprising a latch lever and latch segment on said truck, a rock shaft, having a pair of reversely projecting arms, journaled on said supplemental frame, 5 and links connecting said latch lever and said drag bars with the arms of said rock shaft.

In testimony whereof I affix my signature in presence of two witnesses.

MATHIAS KUEFLER.

Witnesses:
JOHN MILLER,
MARTIN HAEHN.

Copies of this patent may be obtained for five cents each, by addressing the "Commissioner of Patents, Washington, D. C."